US012235399B2

(12) United States Patent
Hiroshima et al.

(10) Patent No.: US 12,235,399 B2
(45) Date of Patent: Feb. 25, 2025

(54) ENERGY MEASUREMENT APPARATUS, ENERGY COMPUTATION APPARATUS, ENERGY MEASUREMENT METHOD, AND ENERGY COMPUTATION PROGRAM

(71) Applicant: Nippon Telegraph and Telephone Corporation, Tokyo (JP)

(72) Inventors: Yoshiharu Hiroshima, Musashino (JP); Hidenori Iwashita, Musashino (JP); Yuichiro Okugawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 196 days.

(21) Appl. No.: 18/012,746

(22) PCT Filed: Jun. 24, 2020

(86) PCT No.: PCT/JP2020/024819
§ 371 (c)(1),
(2) Date: Dec. 23, 2022

(87) PCT Pub. No.: WO2021/260845
PCT Pub. Date: Dec. 30, 2021

(65) Prior Publication Data
US 2023/0314640 A1    Oct. 5, 2023

(51) Int. Cl.
*G01T 3/08* (2006.01)
*G01T 1/24* (2006.01)
(52) U.S. Cl.
CPC ............... *G01T 3/08* (2013.01); *G01T 1/247* (2013.01)

(58) Field of Classification Search
CPC .................................. G01T 3/08; G01T 1/247
See application file for complete search history.

(56) References Cited

U.S. PATENT DOCUMENTS

| 5,026,988 | A | * | 6/1991 | Mendenhall | .......... H01J 49/142 |
| | | | | | 250/281 |
| 5,347,126 | A | * | 9/1994 | Krauss | .......... H01J 49/40 |
| | | | | | 850/52 |
| 9,151,852 | B1 | * | 10/2015 | Marleau | .......... G01T 3/005 |

(Continued)

OTHER PUBLICATIONS

Asai et al. (Terrestrial Neutron-Induced Single-Event Burnout in SiC Power Diodes, IEEE Transactions on Nuclear Science, vol. 59, No. 4, Aug. 2012, pp. 880-885) (Year: 2012).*

(Continued)

*Primary Examiner* — Hugh Maupin
(74) *Attorney, Agent, or Firm* — Fish & Richardson P.C.

(57) ABSTRACT

A target that is irradiated with a charged particle to emit a neutron, an output circuit such as a DC/DC converter that includes a semiconductor element and that outputs voltage during normal operation, and a counter that measures elapsed time with a point in time when the neutron is emitted from the target defined as a starting point are included. Furthermore, a measurement unit that measures the voltage output from the output circuit, and a calculation unit that calculates time of flight of the neutron based on a time when a measurement voltage value measured by the measurement unit falls below a predetermined threshold value and the elapsed time measured by the counter and that calculates energy of the neutron based on the calculated time of flight are included.

4 Claims, 4 Drawing Sheets

(56) References Cited

U.S. PATENT DOCUMENTS

| | | | |
|---|---|---|---|
| 2008/0158747 A1* | 7/2008 | Voldman | H03K 19/0033 |
| | | | 716/120 |
| 2010/0084568 A1* | 4/2010 | Lagarec | H01J 37/3005 |
| | | | 250/397 |
| 2010/0224786 A1* | 9/2010 | Gullickson | G01V 5/281 |
| | | | 250/370.03 |
| 2011/0147578 A1* | 6/2011 | Schultz | H01J 49/0004 |
| | | | 250/288 |
| 2014/0270034 A1* | 9/2014 | Clayton | G01V 5/281 |
| | | | 376/154 |

OTHER PUBLICATIONS

Asai et al. (Terrestrial Neutron-Induced Single-Event Burnout in SiC Power Diodes, IEEE Transactions on Nuclear Science, vol. 59, No. 4, Aug. 2012, pp. 880-885)("Asai") (Year: 2012).*

[No Author Listed], "Research on Cosmic Ray-Induced Burnout Resistance in Power Devices," The Institute of Electrical Engineers of Japan Technology Development Report, 2016, 3 pages (with English Translation).

* cited by examiner

ENERGY MEASUREMENT APPARATUS, ENERGY COMPUTATION APPARATUS, ENERGY MEASUREMENT METHOD, AND ENERGY COMPUTATION PROGRAM

CROSS-REFERENCE TO RELATED APPLICATIONS

This application is a National Stage application under 35 U.S.C. § 371 of International Application No. PCT/JP2020/024819, having an International Filing Date of Jun. 24, 2020, the disclosure of which is considered part of the disclosure of this application, and is incorporated by reference in its entirety into this application.

TECHNICAL FIELD

The present invention relates to an energy measurement apparatus, an energy computation apparatus, an energy measurement method, and an energy computation program for measuring energy of particle radiation.

BACKGROUND ART

When high-energy particles contained in cosmic rays collide with atomic nuclei of oxygen and nitrogen in the earth's atmosphere, neutron rays (particle radiation) are generated and fall onto the ground. Additionally, when circuit boards being used in many electronic devices are irradiated with neutron rays, overcurrent flows, and circuit elements mounted on the circuit boards may be burned (see Non Patent Literature (NPL) 1).

In this way, a phenomenon in which a single particle such as a neutron is incident on a circuit element such as a memory, overcurrent flows into the circuit element due to charges generated because of nuclear reaction, and the circuit element is burned out is referred to as a single event burnout (SEB). There is a concern that the influence caused by SEB has a greater impact in future electronic devices for which circuit elements have fine structures. Thus, it is required to detect energy of neutron rays that may cause SEB.

CITATION LIST

Non Patent Literature

NPL 1: (Literature 1: Shoji and Nishida, "Research on Cosmic Ray-Induced Burnout Resistance in Power Devices", Technical Development Report of the Institute of Electrical Engineers of Japan, 2016)

SUMMARY OF THE INVENTION

Technical Problem

An SEB cross section of a circuit element (a measure representing a percentage at which a particle generates SEB) is dependent on the energy of neutron rays being irradiated. Neutron rays generated in nature have a wide energy band from about 1 [MeV] to 1000 [MeV]. In order to evaluate the easiness of occurrence of SEB caused by the neutron rays in an electronic device, a cross section of SEB for each level of energy needs to be evaluated and accumulated.

A time-of-flight method is known as a method for detecting the energy of particle radiation such as neutron rays. The time-of-flight method is a method of measuring time required for flight of a certain distance to calculate a velocity of a particle and converting the velocity into particle energy.

An energy E of a neutron can be represented by Equation (1) below when a velocity of the neutron is denoted as v. In Equation (1), m is a mass of the neutron.

$$E=(\tfrac{1}{2})mv^2 \quad (1)$$

Thus, generating a pulse neutron by using an accelerator or a nuclear reactor, installing a detector at a certain distance, and measuring a time difference (time of flight) between the time when a pulse neutron is generated and the time when the neutron is detected by the detector, allow the energy of the neutron to be determined.

However, such a method for detecting the energy cannot continuously obtain cross sections from neutron rays with a wide range of energy because a cross section is evaluated by using neutron rays having specific energy. In order to evaluate the SEB cross sections from neutron rays with a wide range of energy levels, neutron rays having specific energy need to be generated over a wide range, and thus many particle accelerators are required.

The present invention has been made in view of the above circumstances, and an object thereof is to provide an energy measurement apparatus, an energy computation apparatus, an energy measurement method, and an energy computation program that are capable of continuously measuring the energy of particle radiation having a wide range of energy levels.

Means for Solving the Problem

An energy measurement apparatus according to an aspect of the present invention includes: a target that is irradiated with a particle to emit particle radiation; a substrate mounted with an output circuit including a semiconductor element, the output circuit being configured to output voltage or current during normal operation; a clocking unit configured to measure elapsed time with a point in time when the particle radiation is emitted from the target defined as a starting point; a measurement unit configured to measure the voltage or the current output from the output circuit; and a calculation unit configured to calculate time of flight of the particle radiation based on a time when a measurement value measured by the measurement unit falls below a predetermined threshold value and the elapsed time measured by the clocking unit, the calculation unit being configured to calculate energy of the particle radiation based on the calculated time of flight.

An energy computation apparatus of an aspect of the present invention includes: a clocking unit configured to measure elapsed time with a point in time when particle radiation is emitted from a target, the target being irradiated with a particle to emit the particle radiation, defined as a starting point; a measurement unit configured to measure voltage or current output from an output circuit including a semiconductor element, the output circuit being configured to output the voltage or the current during normal operation; and a calculation unit configured to calculate time of flight of the particle radiation based on a time when a measurement value measured by the measurement unit falls below a predetermined threshold value and the elapsed time measured by the clocking unit, the calculation unit being configured to calculate energy of the particle radiation based on the calculated time of flight.

An energy measurement method according to an aspect of the present invention includes the steps of: irradiating a target with a particle to emit particle radiation; irradiating, with the particle radiation, a substrate mounted with an output circuit including a semiconductor element, the output circuit configured to output voltage or current during normal operation; measuring, at a clocking unit, elapsed time with a point in time when the particle radiation is emitted from the target defined as a starting point; measuring, at a measurement unit, the voltage and the current output from the output circuit; and calculating time of flight of the particle radiation based on a time when a measurement value measured by the measurement unit falls below a predetermined threshold value and the elapsed time measured by the clocking unit and calculating energy of the particle radiation based on the calculated time of flight.

An aspect of the present invention is an energy computation program for causing a computer to function as the energy computation apparatus mentioned above.

Effects of the Invention

According to the present invention, the energy of particle radiation having a wide range of energy levels can be continuously measured.

DESCRIPTION OF EMBODIMENTS

Description about Configuration of Present Embodiment

Figure 1:
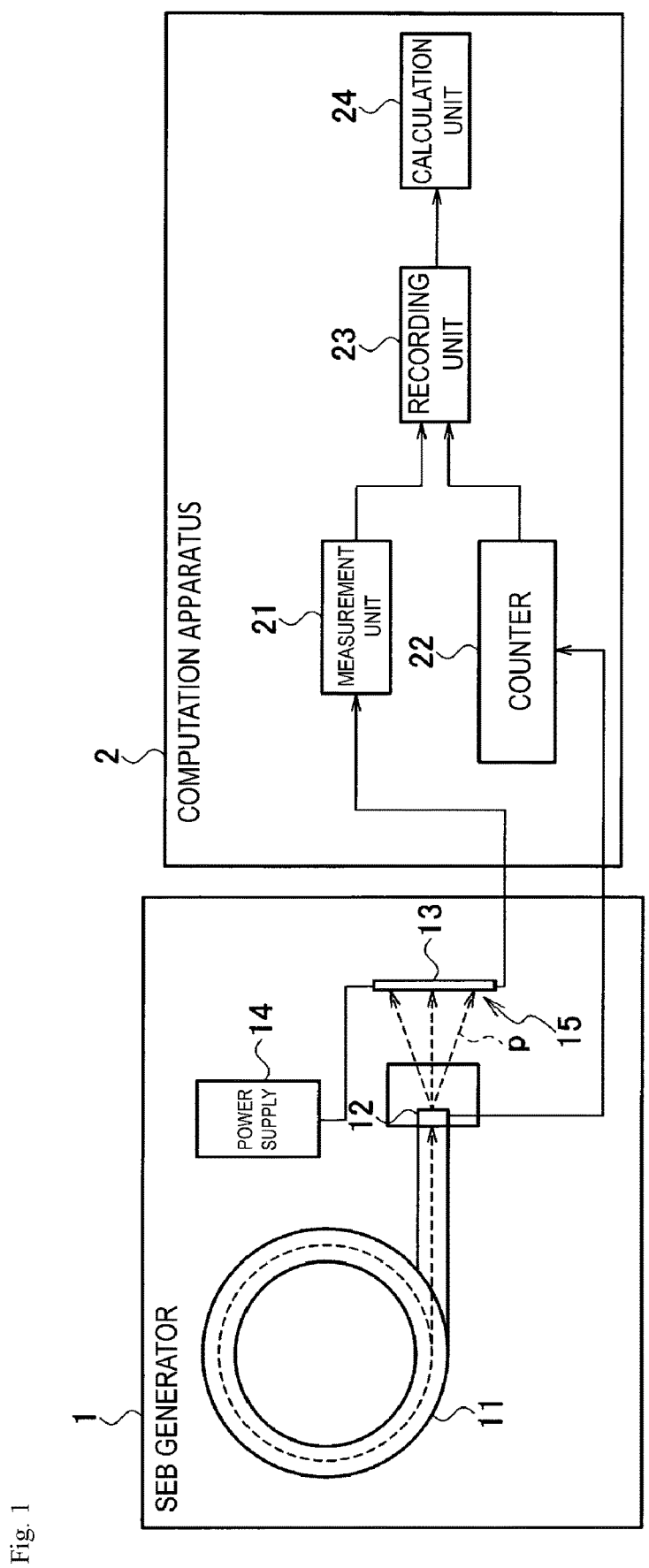
FIG. 1 is a block diagram illustrating a configuration of an energy measurement apparatus according to an embodiment of the present invention.

Hereinafter, an embodiment of the present invention will be described with reference to the drawings. FIG. 1 is a block diagram illustrating a configuration of an energy measurement apparatus according to an embodiment of the present invention. As illustrated in FIG. 1, an energy measurement apparatus 100 according to the present embodiment includes an SEB generator 1 and a computation apparatus 2 (energy computation apparatus) connected to the SEB generator 1.

The SEB generator 1 includes a particle accelerator 11, a target 12, a circuit board 13, and a power supply 14.

The particle accelerator 11 generates accelerated particles (for example, charged particles such as protons and electrons) and irradiates the target 12 with the accelerated particles.

Examples of the target 12 include a substrate formed of a material that generates neutrons when charged particles of beryllium, lead, tungsten, or the like are caused to collide with the material. The target 12 emits neutrons due to the collision of high-speed particles emitted by the particle accelerator 11.

The circuit board 13 is a substrate on which an output circuit 15 including a semiconductor element is mounted. The circuit board 13 is mounted with, for example, a DC/DC converter installed with a recitification diode (semiconductor element) as the output circuit 15. The DC/DC converter outputs voltage during normal operation. That is, the DC/DC converter converts DC voltage supplied by the power supply 14 to a different level of DC voltage to output the converted DC voltage. Note that the output circuit 15 installed on the circuit board is not limited to the DC/DC converter, and is only required to be the output circuit 15 that normally outputs voltage or current. Additionally, the semiconductor element is not limited to the diode, and other semiconductor elements, for example, a transistor such as a MOSFET and an IGBT or a thyristor, may be used.

The power supply 14 is, for example, a DC power supply, and supplies power to the DC/DC converter mounted on the circuit board 13.

On the other hand, the computation apparatus 2 includes a measurement unit 21, a counter 22, a recording unit 23, and a calculation unit 24.

The measurement unit 21 measures the output voltage from the DC/DC converter mounted on the circuit board 13. The data of a voltage measurement value measured by the measurement unit 21 is output to the recording unit 23.

The counter 22 (clocking unit) generates a count value corresponding to the lapse of time, and outputs the generated count value to the recording unit 23. For example, when a clock frequency is 50 [MHz], the count value is output to the recording unit 23 every 20 [ns]. When a neutron is emitted from the target 12, the counter 22 also resets the count value with the emission of the neutron serving as a trigger. Thus, the count value output from the counter 22 indicates elapsed time with a point in time when the neutron is emitted defined as a starting point. In other words, the counter 22 has a function as the clocking unit configured to measure elapsed time with a point in time when a neutron is emitted (particle radiation) from the target 12 defined as a starting point.

Figure 3:
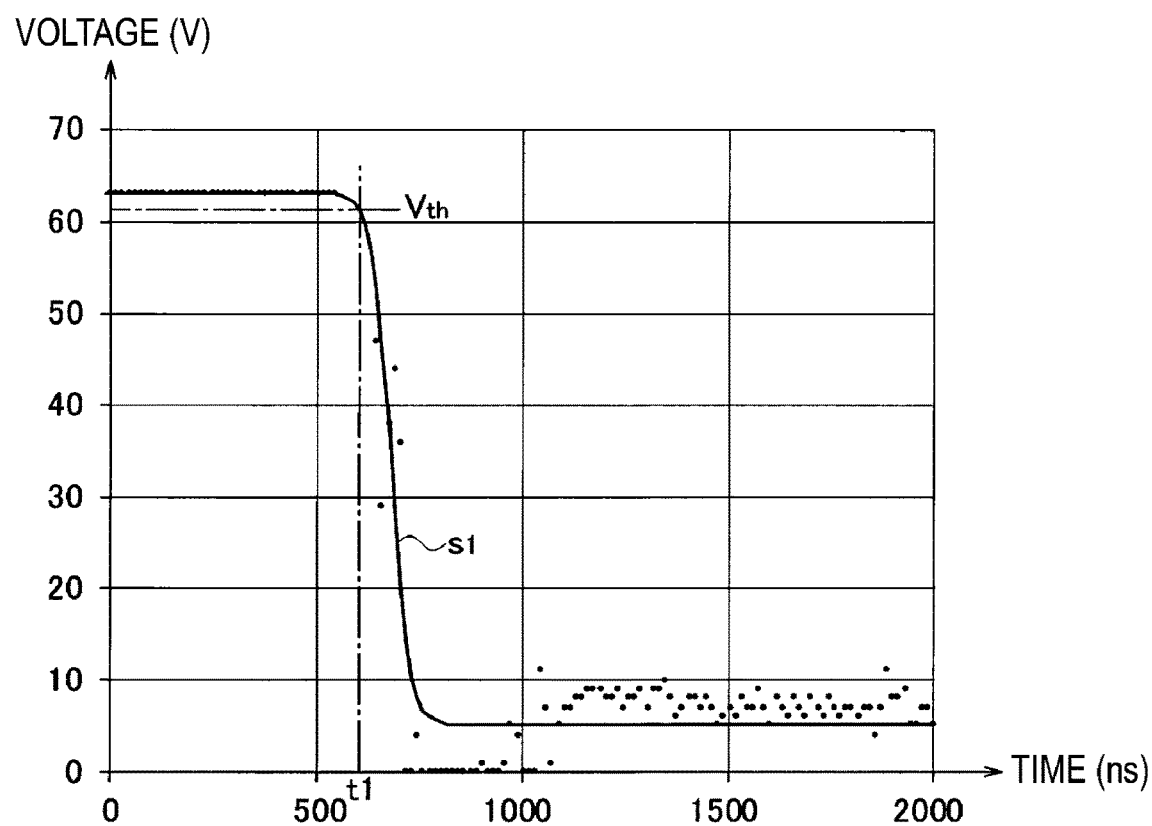
FIG. 3 is a graph illustrating a relationship between a time with a point in time when a neutron is emitted defined as a starting point and a voltage output from a DC/DC converter.

The recording unit 23 has a memory and records a discrete voltage measurement value measured in the measurement unit 21. The recording unit 23 also records the count value output from the counter 22. As a result, the data of the voltage measurement values (indicated by the black points in the figure) plotted with respect to the elapsed time, for example, as illustrated in FIG. 3, is recorded in the memory.

The calculation unit 24 monitors a voltage measurement value Va measured by the measurement unit 21, and calculates an approximate curve (for example, a sigmoid logistic curve) of the discrete voltage measurement values when the voltage measurement value Va falls below a predetermined threshold voltage Vth (a threshold value set in advance). As a result, for example, an approximate curve s1 illustrated in FIG. 3 is obtained.

The calculation unit 24 also measures a time t1 at which the voltage measurement value falls below the threshold voltage Vth, based on the approximate curve s1 described above. As described above, counting of the count value output from the counter 22 starts with the point in time when the neutron is emitted from the target 12 defined as the starting point, so that the above-described time t1 corresponds to time from the emission of the neutron from the target 12 to the reduction of the output voltage from the DC/DC converter mounted on the circuit board 13, that is, time of flight until the neutron reaches the circuit board 13 from the target 12.

The calculation unit 24 calculates an energy E of the neutron according to Equation (1) below based on the calculated time of flight. As m is a mass of the neutron and a velocity v can be determined by using a distance and the time of flight from the target 12 to the circuit board 13, the energy E of the neutron can be calculated according to Equation (1) below.

$$E=(1/2)mv^2 \qquad (1)$$

Description of Action of Present Embodiment

Figure 2:
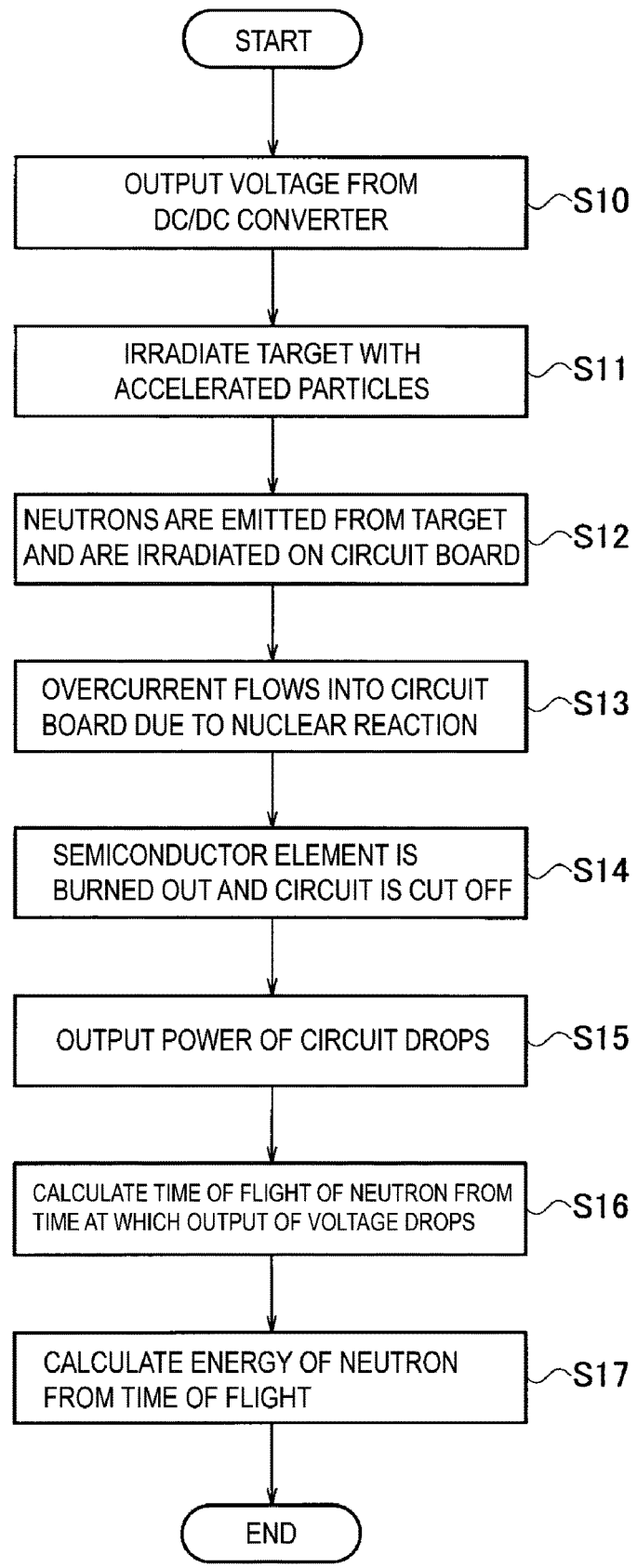
FIG. 2 is a flowchart illustrating a processing procedure of the energy measurement apparatus according to the embodiment of the present invention.

FIG. 2 is a flowchart illustrating a processing procedure of the energy measurement apparatus 100 according to the present embodiment. FIG. 3 is a graph illustrating voltage measurement values measured by the measurement unit 21 and the approximate curve. An action of the energy measurement apparatus 100 according to the present embodiment will be described below with reference to FIGS. 2 and 3.

First, a voltage is supplied to the DC/DC converter mounted on the circuit board 13 from the power supply 14, and the DC/DC converter outputs a predetermined voltage. For example, a DC voltage V1 is supplied from the power supply 14, and is converted into a DC voltage V2 by the DC/DC converter, and the converted DC voltage V2 is output (step S10 in FIG. 2).

Thereafter, in step S11 illustrated in FIG. 2, the particle accelerator 11 of the SEB generator 1 is activated and irradiates the target 12 with accelerated charged particles (for example, protons).

In step S12, neutrons are emitted from the target 12. That is, when the target 12 formed of a material such as beryllium, lead, and tungsten is irradiated with charged particles, a neutron p is emitted from the target 12. The emitted neutron p is irradiated on the circuit board 13. Further, a count value to be output from the counter 22 is reset with a point in time when the neutron p is emitted from the target 12 serving as a trigger.

In step S13, a nuclear reaction occurs when a diode (semiconductor element) installed in the DC/DC converter mounted on the circuit board 13 is irradiated with the neutron, and SEB occurs in the semiconductor constituting the diode. Thus, overcurrent flows into the DC/DC converter.

In step S14, the DC/DC converter is burned out due to the overcurrent and the circuit is cut off.

In step S15, when the circuit of the DC/DC converter is cut off, the output voltage from the DC/DC converter measured by the measurement unit 21 drops.

In step S16, the calculation unit 24 calculates the approximate curve s1 illustrated in FIG. 3 based on voltage measurement values measured by the measurement unit 21. Furthermore, the calculation unit 24 calculates the time t1 at which the approximate curve s1 falls below the threshold voltage Vth, and calculates time of flight of the neutron p based on the time t1. At this time, a velocity of the neutron is so fast, compared to the light velocity, that the velocity of the neutron cannot be ignored, and thus, a relativistic time delay needs to be considered.

In step S17, the calculation unit 24 calculates the energy of the neutron that causes the SEB to occur in the circuit of the DC/DC converter based on the time of flight. Specifically, the distance between the target 12 and the circuit board 13 illustrated in FIG. 1 is known, and thus, the energy of the neutron can be calculated according to Equation (1) described above based on the time of flight.

In addition, the SEB randomly occurs in the DC/DC converter mounted on the circuit board 13, and thus, the energy of neutrons can be continuously measured by accumulating the above-described processing.

Further, a SEB cross section at a certain energy is a numerical value obtained by dividing the number of times of SEB occurrence at the energy by the number of irradiated neutrons. Thus, the SEB cross section can be calculated by counting the number of times of SEB occurrence and counting the number of the neutrons irradiated on the DC/DC converter by using a neutron measuring instrument (not illustrated).

Description of Effects of Present Embodiment

In this way, in the energy measurement apparatus 100 according to the present embodiment, the target 12 is irradiated with charged particles accelerated by the particle accelerator 11 to generate neutrons (particle radiation), and the neutrons are irradiated on the output circuit 15 (for example, the DC/DC converter) installed on the circuit board 13. Based on the time at which the output voltage of the output circuit 15 drops and the time at which the neutron is generated, time of flight of the neutron can be calculated. Then, the energy of neutrons having a wide range of energy levels can be continuously calculated based on the calculated time of flight.

As a result, the energy of the neutron that causes SEB to occur in the circuit element installed in the output circuit 15 can be determined. The result is accumulated, thereby allowing the SEB cross section for each level of neutron energy of the circuit element to be continuously measured.

In addition, a change in voltage or current generated in the output circuit 15 such as the DC/DC converter is detected, thereby allowing time of flight of the neutron to be measured. Thus, the neutron energy can be detected in short time.

Furthermore, the calculation unit 24 calculates an approximate curve (the approximate curve s1 illustrated in FIG. 3) indicating a change in voltage measured by the measurement unit 21 with respect to elapsed time. Then, the calculation unit 24 calculates the time t1 at which the output voltage falls below the threshold voltage Vth based on the approximate curve s1, and calculates the time of flight of the neutron based on the time t1. Thus, it is possible to calculate the time of flight of the neutron with higher accuracy.

Note that in the embodiment described above, an abnormality of the output voltage (for example, a drop in output voltage of the DC/DC converter) from the output circuit 15 mounted in the circuit board 13 has been described as an example, but the present invention is not limited to the output voltage, and an abnormality of an output current can be detected to measure the time of flight of the neutron.

Further, in the above-described embodiment, the neutron rays have been described as an example of the particle radiation, but the present invention is not limited to the neutron rays, and other types of particle radiation such as alpha rays, beta rays, positron rays, proton rays, and heavy-ion beams can also be applied.

Figure 4:
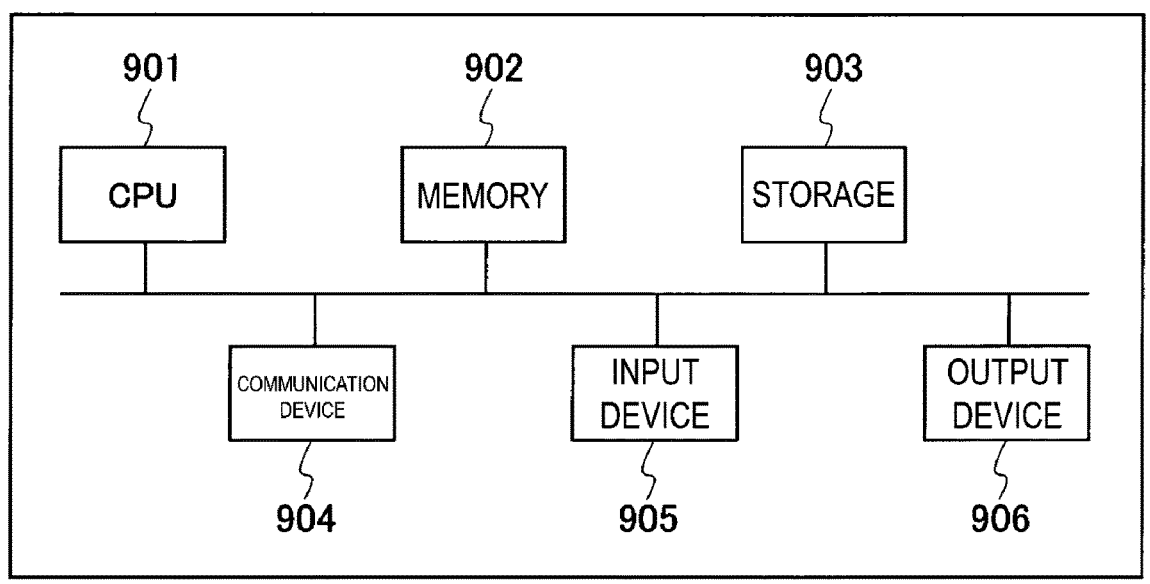
FIG. 4 is a block diagram illustrating a functional configuration of a computation apparatus installed in the energy measurement apparatus according to the present invention.

For the computation apparatus 2 according to the aforementioned present embodiment, as illustrated in FIG. 4, it is possible to use a general-purpose computer system including a central processing unit (CPU, a processor) 901, a memory 902, a storage (a hard disk drive (HDD), a solid state drive (SSD)) 903, a communication device 904, an input device 905, and an output device 906, for example. The memory 902 and the storage 903 are storage devices. In the computer system, the CPU 901 executes a predetermined program loaded in the memory 902 to achieve the functions of the computation apparatus 2.

Note that the computation apparatus 2 may be implemented by using one computer or may be implemented by using a plurality of computers. The computation apparatus 2 may also be a virtual machine implemented on a computer.

Note that the program for the computation apparatus 2 may be stored in a computer-readable recording medium such as an HDD, an SSD, a universal serial bus (USB) memory, a compact disc (CD), or a digital versatile disc (DVD) or may be distributed via a network.

The present invention is not limited to the above embodiment, and various modifications may be made within the scope of the gist thereof.

REFERENCE SIGNS LIST

1 SEB generator
2 Computation apparatus
11 Particle accelerator
12 Target
13 Circuit board
14 Power supply
15 Output circuit
21 Measurement unit
22 Counter
23 Recording unit
24 Calculation unit
100 Energy measurement apparatus
p Neutron

The invention claimed is:

1. An energy measurement apparatus comprising:
a target that is irradiated with a particle to emit particle radiation;
an output circuit including a semiconductor element, the output circuit being configured to output voltage or current during normal operation;
a clocking unit configured to measure elapsed time with a point in time when the particle radiation is emitted from the target defined as a starting point;
a measurement unit configured to measure the voltage or the current output from the output circuit; and
a calculation unit configured to calculate time of flight of the particle radiation based on a time when a measurement value measured by the measurement unit falls below a predetermined threshold value and the elapsed time measured by the clocking unit, the calculation unit being configured to calculate energy of the particle radiation based on the calculated time of flight,
wherein the calculation unit calculates an approximate curve indicating a change in the voltage or the current measured by the measurement unit with respect to the elapsed time, and calculates the time of flight based on the approximate curve.

2. An energy computation apparatus comprising:
a clocking unit configured to measure elapsed time with a point in time when particle radiation is emitted from a target, the target being irradiated with a particle to emit the particle radiation, defined as a starting point;
a measurement unit configured to measure voltage or current output from an output circuit including a semiconductor element, the output circuit being configured to output the voltage or the current during normal operation; and
a calculation unit configured to calculate time of flight of the particle radiation based on a time when a measurement value measured by the measurement unit falls below a predetermined threshold value and the elapsed time measured by the clocking unit, the calculation unit being configured to calculate energy of the particle radiation based on the calculated time of flight.

3. An energy measurement method comprising:
irradiating a target with a particle to emit particle radiation;
irradiating, with the particle radiation, a substrate mounted with an output circuit including a semiconductor element, the output circuit configured to output voltage or current during normal operation;
measuring, at a clocking unit, elapsed time with a point in time when the particle radiation is emitted from the target defined as a starting point;
measuring, at a measurement unit, the voltage or the current output from the output circuit; and
calculating, at a calculation unit, time of flight of the particle radiation based on a time when a measurement value measured by the measurement unit falls below a predetermined threshold value and the elapsed time measured by the clocking unit and calculating, at the calculation unit, energy of the particle radiation based on the calculated time of flight.

4. A non-transitory computer-readable storage medium storing an energy computation program, wherein executing of the energy computation program causes one or more computers to perform operations comprising:
measuring elapsed time with a point in time when particle radiation is emitted from a target, the target being irradiated with a particle to emit the particle radiation, defined as a starting point;
measuring voltage or current output from an output circuit including a semiconductor element, the output circuit being configured to output the voltage or the current during normal operation; and
calculating time of flight of the particle radiation based on a time when a measurement value falls below a predetermined threshold value and the elapsed time and calculating energy of the particle radiation based on the calculated time of flight.

* * * * *